Oct. 8, 1940.  H. L. NEWELL  2,217,450
TOASTER
Filed Aug. 17, 1938  2 Sheets-Sheet 2
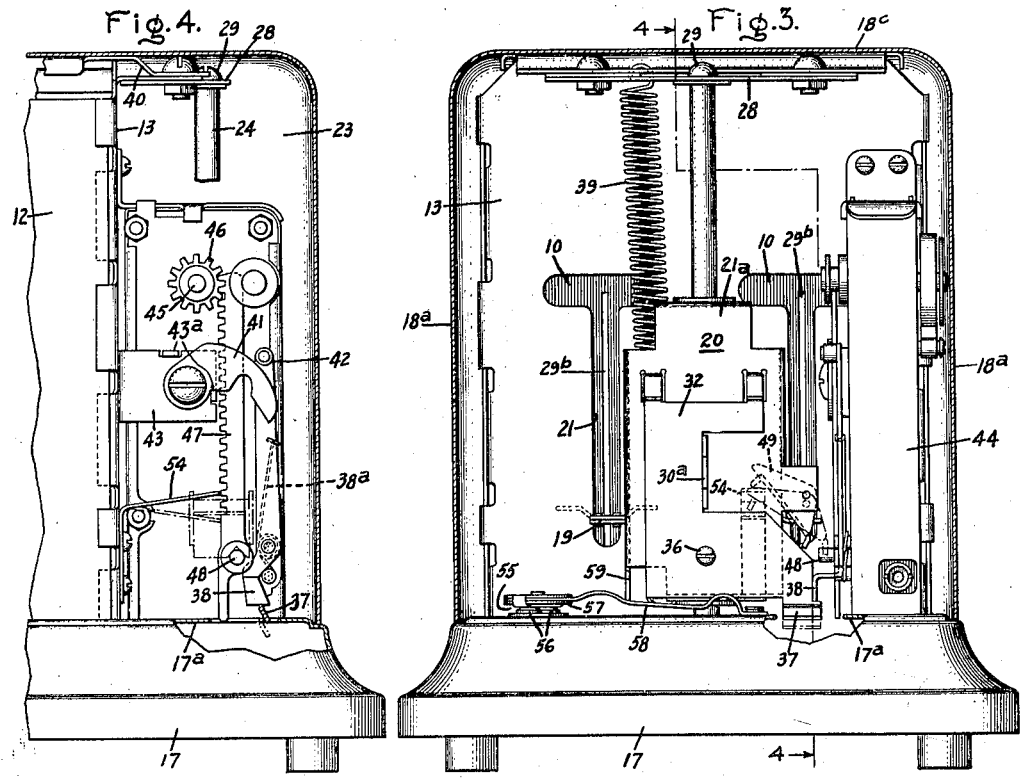
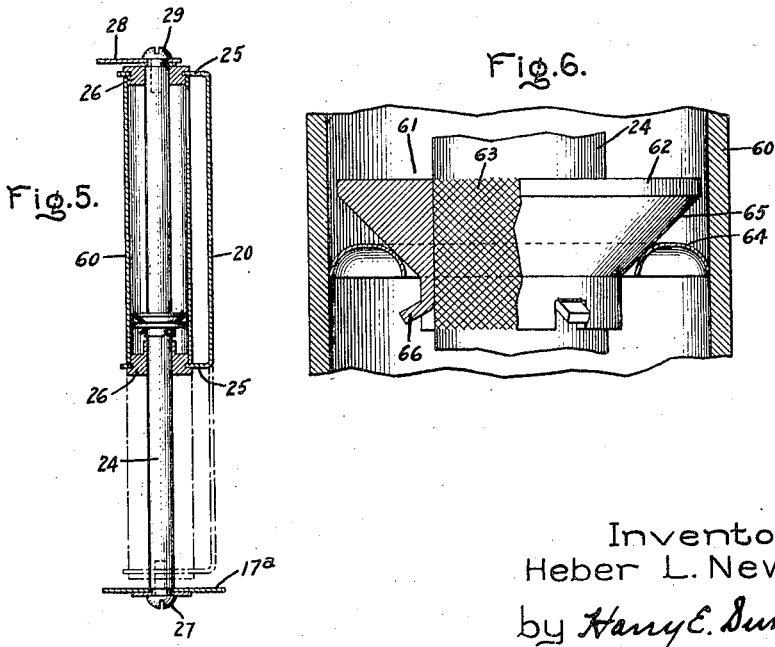
Inventor:
Heber L. Newell,
by Harry E. Dunham
His Attorney.

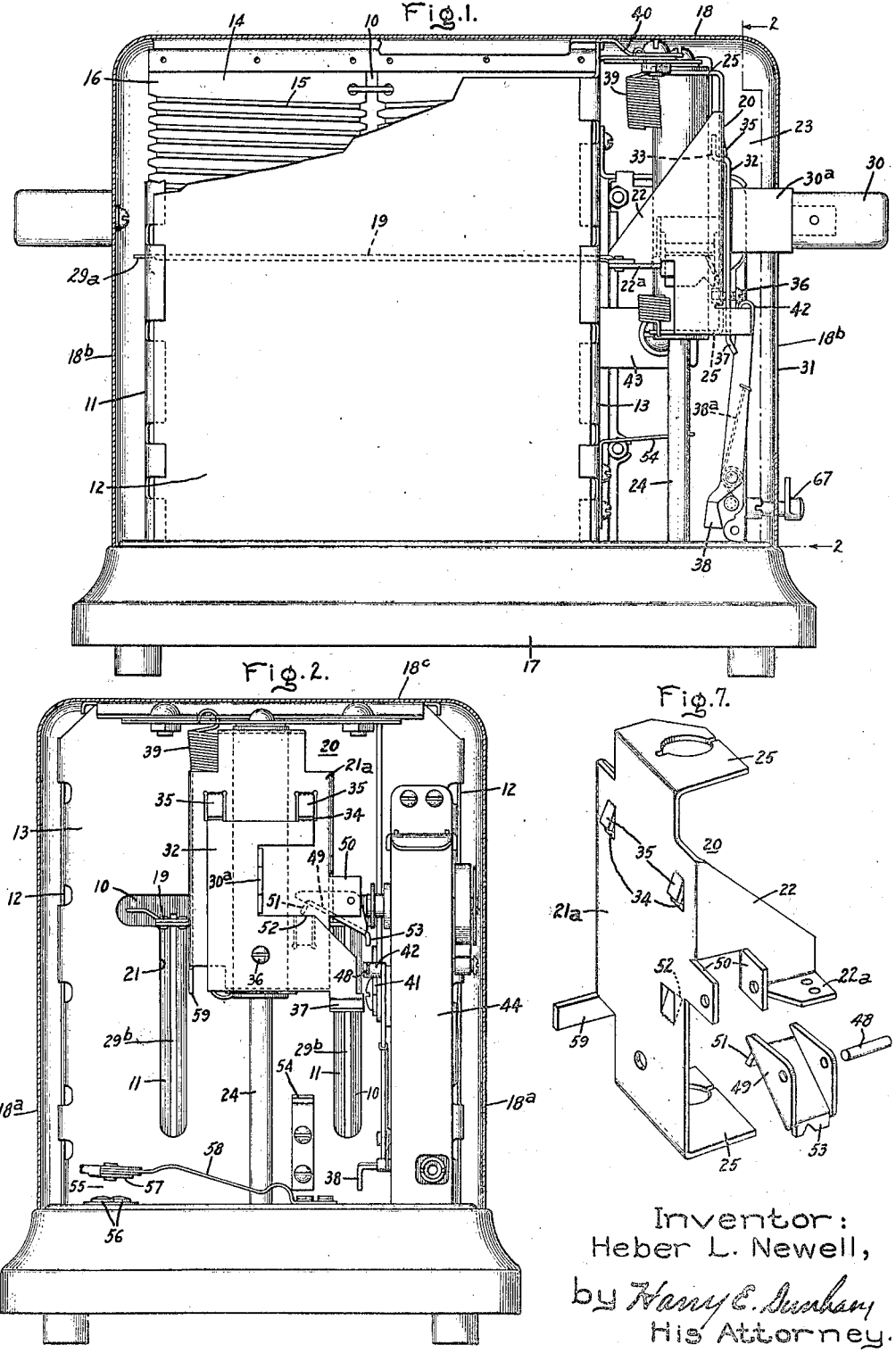

Patented Oct. 8, 1940

2,217,450

UNITED STATES PATENT OFFICE 2,217,450

TOASTER

Heber L. Newell, Stratford, Conn., assignor to General Electric Company, a corporation of New York Application August 17, 1938, Serial No. 225,329

19 Claims. (Cl. 219—19)

This invention relates to toasters, more particularly to electrically heated bread toasters, and it has for its object an improved device of this character which is simple and inexpensive in construction, and durable and efficient in its operation.

This invention is particularly applicable to automatic bread toasters wherein a timing mechanism measures the toasting interval and causes the ejection of the toasted slice from the heating chamber at the proper time, and it contemplates an improved and simplified control in a toaster of this character.

In a copending application of Jacob L. Shroyer, Serial No. 738,973, filed August 8, 1934, and assigned to the Edison General Electric Appliance Company, Inc., there are described and broadly claimed various features which are incorporated in the toaster of this application.

For a more complete understanding of this invention, reference should be had to the accompanying drawings in which Fig. 1 is a side elevation of an electric toaster mainly in section embodying this invention, parts being broken away so as to illustrate certain details of construction; Fig. 2 is a vertical sectional view taken through the line 2—2 of Fig. 1; Fig. 3 is a vertical sectional view similar to Fig. 2, but illustrating certain parts of the toaster in different operative positions; Fig. 4 is a fragmentary vertical sectional view taken through the line 4—4 of Fig. 3 and looking in the direction of the arrows; Fig. 5 is a vertical sectional view illustrating a part of the control mechanism of the toaster of Figs. 1–4; Fig. 6 is an enlarged fragmentary sectional view taken through a part of the mechanism shown in Fig. 5; and Fig. 7 is an enlarged perspective view of a portion of the control mechanism for the toaster of Figs. 1 to 6.

Referring to the drawings, this invention has been shown in one form as applied to an electric toaster of the automatic type in which the toasted slice is ejected from the heating chamber at the end of a predetermined interval of time. This toaster comprises a pair of heating chambers 10 spaced apart crosswise of the toaster, and which are defined by a rear wall 11, a pair of side walls 12, and a front wall 13. It will be understood that each heating chamber will be provided with a pair of spaced heating elements 14 for applying heat to the chambers. The heating elements 14 may be of any suitable type, but preferably will be provided with a resistance conductor 15 supported on a suitable vertically positioned sheet 16 of electrically insulating material, such as mica.

The walls 11, 12 and 13 defining the heating chambers, and the heating elements 14 are supported on a suitable base 17 which has a top wall 17a that defines the bottom of the chambers. The heating chambers are surrounded by a casing 18, which is as shown is of substantially rectangular form having side walls 18a, front and rear walls 18b, and a top wall 18c. This casing is supported by the base 17, as shown. It will be understood that the top wall 18c will be provided with a pair of elongated openings (not shown) through which bread slices may be inserted into the heating chambers 10.

Mounted in each heating chamber 10 is a suitable slice holder 19. At their forward ends, the slice holders project forwardly through the front wall 13 of the heating chambers where they are attached to a suitable supporting carriage 20. As shown, the front wall 13 is provided with spaced vertically arranged slots 21 which receive the parts of the slice holders that project forwardly through the front wall 13.

The carriage 20, as shown, is provided with a vertical front plate 21a, and with rearwardly extending flanges 22 at the sides of the front plate. The slice holders 19 are directly connected to the horizontal feet 22a on the lower edges of the flanges 22 so as to be supported by the carriage, as shown in Fig. 1.

It will be observed that the front wall 13 of the heating chambers is spaced to the rear of the front wall 18b of the casing 18 so as to define a second chamber 23 that receives the carriage 20. Fixed within this chamber 23 is a vertically positioned rod 24 upon which the carriage 20 is slidably mounted. As shown, the carriage is provided at its upper and lower edges with rearwardly extending portions 25 which are rigidly attached to collars or bushings 26 (Fig. 5) that are slidably mounted on the rod 24. The rod 24 at its lower end is secured to the top wall 17a of the base 17 by means of a screw 27 (Fig. 5), and at its top is secured to a bracket 28 by means of screws 29. The bracket 28 is supported by the walls of the heating chambers.

In order to prevent turning of the carriage 20 on the rod 24, the rear ends of the trays 19 are provided with extensions 29a that are received in vertical slots 29b in the rear wall 11 of the heating chambers.

A knob or handle 30 is connected to the carriage 20 for controlling its movement from its upper or non-toasting position in which it is shown in Figs. 1 and 2 and in which the trays 19 are elevated to its lower or toasting position shown in Fig. 3 where the trays 19 are depressed. This handle, as shown, is positioned in front of the front wall 18b, and is connected with the carriage by a tongue 30a. This tongue, as shown, projects through a vertical slot 31 provided for it in the front wall 18b. The tongue 30a connects the handle 30 directly to a plate-like bracket 32 which is mounted on the plate 20. The bracket 32 is provided at its upper end with tongues 33 which are offset to the rear from the plane of the bracket and which are received in apertures 34 provided for them in the front plate 21a of the carriage 20. As shown, this front plate is provided with tongues 35 that are cut from the metal of the front plate and which are pushed forward slightly, as shown in Fig. 1. This arrangement provides the openings 34 which receive the offset tongues 33 of the bracket, and they cooperate with the tongues to effect a pivotal connection between the bracket and the front plate so that the bracket may be swung with reference to the plate. At its lower end, the front plate 21a carries a stop screw 36 which is passed freely through an aperture provided for it in the bracket and which serves as a stop to limit the pivotal movement of the bracket with reference to the carriage.

The bracket 32 at its lower right-hand end, as viewed in Figs. 2 and 3, carries an offset lug or stop 37 which is adapted to be engaged by a suitable elongated pivoted latch 38. This latch functions to hold the carriage, and hence, the slice holders 19 in their lower or toasting positions against the force of a suitable tension spring 39 which biases the carriage and slice holders to their upper or non-toasting positions. As shown, this spring has its lower end secured to the lower backwardly extending part 25 of the carriage and its upper end anchored to a bracket 40 secured in the top of the chamber 23.

The latch 38 is biased to its locking position by means of a spring 38a. This position is defined by means of a cam 41 which engages an abutment 42 provided on the upper end of the latch, as shown in Fig. 4. The cam is pivoted to a bracket 43 to move on a fixed axis through a limited angle. The limits of this angle are defined by stops 43a on the bracket 43. The bracket 43 is rigidly secured to the front wall 13 of the heating chambers.

The cam 41 is operated on its fixed axis to move the latch 38 to release the carriage 20 and hence the slice holders 19 at the end of a predetermined interval of time by suitable clockwork mechanism 44 mounted in the front chamber 23. The clockwork mechanism preferably will be of the spring-wound type and it may have any suitable construction. The clockwork mechanism is provided with a winding shaft 45 upon which is mounted a spur gear 46 with which cooperates a winding rack 47. It will be understood that when the winding rack is moved downwardly, as viewed in the drawings, it rotates the winding shaft 45 to wind the clock spring, and that when the rack is released the clock will unwind, and as it does so will elevate the rack to its initial upper position.

The rack at its lower end carries an abutment 48 which when the clock has unwound and the rack reaches its upper position engages the cam 41 to rotate it in a counter-clockwise direction, as viewed in Fig. 4. This movement of the cam operates the abutment 42 on the upper end of the latch 38 to move the latch in a clockwise direction, as viewed in Fig. 4, to release the lug 37 to thereby release the carriage 20 and the slice holders 19, whereby the spring 39 can move the slice holders to their upper non-toasting positions.

The carriage has an operable connection with the winding rack 47 so that when the knob 30 is depressed to move the slice holders to their toasting positions, the rack likewise is depressed to wind the clock. For this purpose, a suitable pawl or latch 49 is pivoted on the carriage. As shown more clearly in Fig. 7, the carriage is provided with spaced ears 50 which receive the latch between them and which mount the latch for pivotal movement. At its left-hand end, as viewed in Figs. 2, 3 and 7, the latch has a downwardly extending tongue 51 which engages a stop 52 on the carriage to limit the counter-clockwise movement of the pawl. At its other end, the latch is provided with a downwardly extending forked tongue 53 which is arranged to engage the abutment 48 on the rack to move the rack downwardly to wind the clock when the carriage is depressed to carry the slice holders to their toasting positions.

The latch or pawl 49 is disconnected from the winding mechanism when the carriage 20 reaches its lower toasting position by means of a tongue-like spring abutment 54 fixed to the front wall 13 in the lower part of the chamber 23. The tongue 54 is positioned to engage the downwardly extending tongue 51 of the latch 49 when the carriage has reached its last toasting position to rotate the latch in a clockwise direction, as viewed in Figs. 2, 3 and 7 to remove it from the abutment 48 on the rack 47.

It will be understood that when the carriage 20 has been moved to its lower toasting position and the attendant has released the pressure on the handle 30, the spring abutment 54 will have sufficient force to move the latch in this clockwise direction to release the clockwork mechanism. The clockwork mechanism thereafter is released to unwind and to permit the rack 47 to move upwardly to release the latch 38, as previously described.

The downward movement of the carriage 20 also serves to automatically close the energizing circuit of the heating resistances 15 of the heating elements. This circuit includes a switch 55 having spaced fixed contacts 56 connected in the energizing circuit, and a bridging contact 57 arranged to engage both of these contacts to complete the energizing circuit. The bridging contact 57 is carried by a spring arm 58 that biases the bridging contact to its open position, as shown in Fig. 2. The carriage, however, carries a depending tongue 59 at its left-hand side, as viewed in Figs. 2, 3 and 7, which is positioned to engage the spring 58 to move it from its open position of Fig. 2 to its closed position of Fig. 3 when the carriage is moved to its lower toasting position of Fig. 3.

A suitable dash pot is provided to cushion the upward movement of the slice holders. As shown, the carriage supports a suitable dash pot cylinder 60 between the collars 26 so that the cylinder is moved upwardly and downwardly with the carriage as it moves up and down. Fixed upon the shaft 24 is a dash pot piston 61 comprising a metallic seat 62 rigidly secured to the shaft 24, as by means of a knurled section 63. A flexible valve-like member 64 is supported by the member 62 to move upwardly against a conical or inclined surface 65 and downwardly against seats 66. It will be understood that when the carriage moves downwardly, the cylinder 60 likewise moves downwardly and as it so moves, the valve 64 is moved downwardly against the seats 66. Air is free to move from the upper to the lower end of the cylinder 60. However, when the carriage is released and the cylinder moves up, the valve 64 is moved up and wedges between the surface 65 and the cylinder. This traps the air in the lower portion of the cylinder to cushion the movement of the carriage. This air leaks out slowly through the opening in the lower collar 26 that receives the rod 24.

In the operation of the toaster, it will be understood that the toaster will be connected to a suitable source of electrical supply (not shown) by means of a suitable twin supply conductor (not shown), but that the energizing circuit for the heating elements 14 will not be completed because the switch 55 will be in its open position. The slices to be toasted will then be placed through the openings in the top 18c so as to be supported by the holders 19. The knob 30 will then be depressed. This operation will move the carriage 20 and the slice holders 19 to their toasting positions, and also will wind the clockwork mechanism due to the fact that the latch 49 will engage with the abutment 48 of the winding rack 47 to move the winding rack downwardly. When the carriage 20 reaches its toasting position, the latch 38 will engage the lug 37 on the bracket 32 to hold the carriage down, and when the pressure on the knob 30 is released the spring abutment 54 will rotate the latch 53 to disengage the winding rack. The clockwork mechanism thereupon will elevate the rack and when the rack reaches its upper position, its abutment 48 will engage the cam 41 to move it to cause the latch 38 to disengage the carriage, whereupon the carriage is moved upwardly to its non-toasting position by the spring 39. As it thus moves upwardly the latch 49 pivots slightly in the clockwise direction so that its end 53 can move upwardly above the abutment 48 to position itself for the subsequent toasting operation. It will be understood that the dash pot construction will cushion the upward movement of the carriage and the slice holders.

The toaster is provided with a suitable control knob 67 for governing the basic speed or time setting of the clockwork mechanism, and thereby the toasting interval.

In the event that the attendant wishes to release the carriage 20 and the slice holders 19 from the latch 38 before the timing mechanism has operated to release the latch 38, the knob 30 is grasped and moved upwardly slightly so as to pivot the bracket 32 about its upper edge to move the lug 37 outwardly from the latch 38. This, of course, releases the bracket and carriage and permits them to move upwardly to their non-toasting position. It will be understood that the stop 36 will be so positioned that the bracket is permitted to move outwardly sufficiently far from the carriage to release the lug 37.

It will be observed that the toaster of this invention is extremely simple in its construction. The trays 19 are moved to their toasting positions, the clockwork mechanism is wound and released, the carriage is latched in its lower position to hold the trays down, and the switch is closed all by a simple downward movement of the knob 30. The clockwork mechanism while unwinding operates through a small simple cam 41 and latch 38 to release the bread slices after they have been toasted. Moreover, the operator can by a simple upward movement of the handle 30 manually release the slices independently of the clockwork mechanism, if it be desired to do so. In addition to this, it will be observed that a simple dash pot mechanism operated by the carriage is provided to cushion the upward movement of the slice holders.

Furthermore, it will be observed that the entire control mechanism including the switch, slice holder, carriage, clockwork mechanism, biasing spring 39 and dash pot mechanism all are arranged in a close compact assembly in the front chamber 23.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A toaster comprising a heating chamber, a slice holder in said chamber mounted for movement between a toasting position and a non-toasting position, means biasing the slice holder to its non-toasting position, a handle connected to the holder moveable from one position to another to move the holder to the toasting position, a clockwork mechanism connected to the handle so as to be energized when the handle is operated to move the holder to the toasting position, means for disconnecting the clockwork mechanism from the handle when the slice holder reaches the toasting position to permit the clockwork mechanism to operate to measure a toasting period independently of the handle, a latch engaging a part connected to said handle to hold the handle in its other position and the slice holder in its toasting position while the clockwise mechanism is operating, and means operated by the clockwork mechanism upon the expiration of said toasting interval to release said latch to permit said biasing means to move the slice holder to the non-toasting position and to return the handle to said one position.

2. A toaster comprising a heating chamber, a slice holder in said chamber, a vertically movable carriage attached to said holder for moving the holder between a toasting position in said heating chamber and an upper non-toasting position, means biasing the holder and carriage to the non-toasting position, a clockwork mechanism, means on the carriage engaging the winding member of the clockwork mechanism to wind the clock when the carriage is moved to lower the slice holder to its toasting position, means releasing said engaging means from said winding member when said holder reaches the lower position to free the clockwork mechanism to unwind, and a latch engaging the carriage to hold the carriage, engaging means and slice holder in the toasting position while said clockwork mechanism is unwinding and associated with the timing mechanism to be released thereby at the end of a predetermined interval to free the carriage, and the slice holder and engaging means carried thereby.

3. A toaster comprising a heating chamber, a slice holder in said chamber, a vertically movable carriage attached to said holder for moving the holder between a toasting position in said heating chamber and an upper non-toasting position, means biasing the holder and carriage to the non-toasting position, a clockwork mechanism, means on the carriage engaging the winding member of the clockwork mechanism to wind the clock when the carriage is moved to lower the slice holder to its toasting position, means releasing said engaging means from said winding member when said holder reaches the lower position to free the clockwork mechanism to unwind, a latch engaging the carriage to hold the slice holder and engaging means in toasting position and associated with the timing mechanism to be released thereby at the end of a predetermined interval to free the carriage and the slice holder and engaging means carried thereby, an energizing circuit for said heating chamber, a switch controlling said circuit having a resilient switch arm biased to its open circuit position, and a member on said carriage engaging said arm to move it to its closed position when the carriage is moved to lower the slice holder to its toasting position.

4. A toaster comprising a heating chamber, a slice holder in said chamber, a vertically movable carriage attached to said holder for moving the holder between a toasting position in said heating chamber and an upper non-toasting position, means biasing the holder and carriage to the non-toasting position, a clockwork mechanism, a pivoted latch on said carriage normally in a position to engage the winding member of said clockwork mechanism so as to wind the mechanism when the carriage is moved to lower the slice-holder to its toasting position, means engaging said latch to release the clockwork mechanism substantially when the holder reaches the toasting position, and a second latch engaging the carriage to hold the slice-holder in its toasting position and associated with the clockwork mechanism so that the latter operates it to release the carriage at the end of a predetermined interval of time.

5. A toaster comprising a heating chamber, a slice holder in said chamber, a vertically movable carriage attached to said holder for moving the holder between a toasting position in said heating chamber and an upper non-toasting position, means biasing the holder and carriage to the non-toasting position, a clockwork mechanism, a pivoted latch on said carriage normally in a position to engage the winding member of said clockwork mechanism so as to wind the mechanism when the carriage is moved to lower the slice holder to its toasting position, means engaging said latch to release the clockwork mechanism substantially when the holder reaches the toasting position, a handle on said carriage for moving it to the toasting position, a second latch engaging the handle to hold the carriage in the toasting position and associated with the clockwork mechanism so that the latter operates it to release the carriage at the end of a predetermined interval of time, and means movably mounting the handle on the carriage so that it can be moved to a position to disengage the second latch to release the carriage independently of the clockwork mechanism.

6. A toaster comprising a heating chamber, a slice holder in said chamber, a vertically movable carriage attached to said holder for moving the holder between a toasting position in said heating chamber and an upper non-toasting position, means biasing the holder and carriage to the non-toasting position, a clockwork mechanism, a pivoted latch on said carriage normally in a position to engage the winding member of said clockwork mechanism so as to wind the mechanism when the carriage is moved to lower the slice holder to its toasting position, means engaging said latch to release the clockwork mechanism substantially when the holder reaches the toasting position, a handle, a bracket securing said handle to said carriage so that the handle when depressed moves the carriage to lower the slice holder to the toasting position, a second latch engaging said bracket to hold the carriage in the toasting position and associated with the clockwork mechanism so that the latter operates it to release the carriage at the end of a predetermined interval of time, and means pivotally mounting said bracket on said carriage so that when the handle is elevated it moves the bracket to disengage the second latch to free the carriage and slice holder.

7. A toaster comprising a heating chamber, a slice holder in said chamber, a vertically movable carriage attached to said holder for moving the holder between a toasting position in said heating chamber and an upper non-toasting position, means biasing the holder and carriage to the non-toasting position, a clockwork mechanism, a pivoted latch on said carriage normally in a position to engage the winding member of said clockwork mechanism so as to wind the mechanism when the carriage is moved to lower the slice holder to its toasting position, a spring abutment positioned to engage said latch to release the clockwork mechanism substantially when the holder reaches the toasting position, and a second latch engaging the carriage to hold the slice holder in its toasting position and associated with said clockwork mechanism so that it releases the carriage at the end of a predetermined interval of time.

8. A toaster comprising a heating chamber, a second chamber in the front of and on the level of said heating chamber, a slice holder in said heating chamber, a carriage for said slice holder, a spring engaging said carriage biasing it upwardly, a handle for said carriage, a bracket supporting said handle pivoted at its upper end to said carriage for pivotal movement on a transverse axis, a stop engaging the lower end of said bracket to limit said pivotal movement, a latch engaging said bracket to hold the carriage in its lower position, a timing mechanism arranged to release the latch automatically at the end of a predetermined interval of time, and the bracket arranged when moved on said carriage within the limit of its pivotal movement to disengage said latch to release the carriage.

9. A toaster comprising a heating chamber, a slice holder in said chamber, a vertically movable carriage secured to said holder to move it vertically in said heating chamber, a spring engaging said carriage biasing it upwardly, a handle for said carriage, a bracket supporting said handle pivoted at its upper end to said carriage for pivotal movement on a transverse axis, a stop engaging the lower end of said bracket to limit said pivotal movement, a latch engaging said bracket to hold the carriage in its lower position, a timing mechanism arranged to release the latch automatically at the end of a predetermined interval of time, and the bracket arranged when moved on said carriage within the limit of its pivotal movement to disengage said latch to release the carriage.

10. A toaster comprising a heating chamber, a slice holder in said chamber, a vertically movable carriage secured to said holder to move it vertically in said chamber between a lower toasting position and an upper non-toasting position, means biasing the carriage to the upper position, a clock having a vertically movable winding bar movable downwardly from its initial position to wind the clock and returned to said position by the subsequent operation of said clock, a latch on said carriage moving said winding bar from said initial position to wind the clock when the carriage is lowered to the toasting position, means releasing said latch from said winding bar in the toasting position of the carriage so that the clock can operate to return said bar to its initial position, a second latch engaging said carriage to hold it in the toasting position, and a cam pivoted to move on a fixed axis and engaged by the winding bar as it is moved upwardly by the clock to move the second latch to release the carriage.

11. A toaster comprising a heating chamber, a slice holder in said chamber, a vertically movable carriage secured to said holder to move it vertically in said chamber between a lower toasting position and an upper non-toasting position, means biasing the carriage to the upper position, a clock having a vertically movable winding bar that moves downwardly from an initial position to wind the clock and is subsequently returned to said initial position by the operation of the clock, a latch on said carriage moving said winding bar downwardly to wind the clock when the carriage is lowered to the toasting position, means releasing said latch from said winding bar in the toasting position of the carriage so that the clock can operate to elevate said bar independently of said carriage, a second latch engaging said carriage to hold it in the toasting position, a cam pivoted on a fixed axis and engaged by the winding bar as it is moved upwardly by the clock to move the second latch to release the carriage, and the part of said carriage engaged by the second latch being manually movable to disengage said second latch to release the carriage independently of the timing mechanism.

12. An electric toaster comprising a toasting chamber, a second chamber in front of the toasting chamber, a vertical rod in said second chamber, a carriage on said rod arranged to slide vertically on it from a lower position to an upper position, a slice holder in said toasting chamber connected to said carriage to be operated between a lower toasting position and an upper non-toasting position, a spring in the second chamber connected to the carriage biasing it to its upper position, a handle, a bracket pivoted at its upper end to said carriage supporting said handle arranged so that when the handle is depressed the carriage is moved downwardly to lower the slice holder to its toasting position, a clockwork mechanism in the second chamber having a winding rack, a pivoted member on the carriage arranged to engage the rack to move it downwardly as the carriage moves downwardly to wind the clock, a spring abutment in the second chamber arranged to engage said pivoted member to move it to release the winding rack when the carriage reaches its lower position, a pivoted latch engaging said bracket to hold the carriage in its lower position, a pivoted cam in said second chamber arranged to be engaged by the rack as it is moved upwardly by the clockwork mechanism to be moved thereby and by this movement to move the latch to release the carriage, and the handle when moved upwardly slightly pivoting the bracket with reference to the carriage to move it to disengage the latch independently of the timing mechanism.

13. A toaster comprising a toasting chamber, a slice holder in said toasting chamber, a carriage secured to said slice holder, a fixed vertical rod mounting said carriage for vertical movement, means biasing said carriage to move upwardly on said rod, a dash pot cylinder on said carriage surrounding said rod, and said rod having a piston in said cylinder arranged to compress the air in the cylinder to cushion the upward movement of the carriage.

14. A toaster comprising a heating chamber, a slice holder in said chamber, a vertically movable carriage secured to said holder to move it vertically in said heating chamber between a lower toasting position and an upper non-toasting position, a spring biasing said carriage upwardly, a handle for said carriage for moving it downwardly to its toasting position, a latch engaging said handle to hold the carriage in its lower toasting position, a timing mechanism arranged to release the latch automatically at the end of a predetermined interval of time, and means mounting said handle for limited freedom of movement with reference to said carriage to disengage said latch to release said carriage.

15. A toaster comprising a heating chamber, a slice holder in said chamber mounted for movement between a toasting position and a non-toasting position, means biasing the slice holder to its non-toasting position, a handle connected to the holder movable from one position to another to move the holder to the toasting position, a clockwork mechanism connected to the handle so as to be energized when the handle is operated to move the holder to the toasting position, means for disconnecting the clockwork mechanism from the handle when the slice holder reaches the toasting position to permit the clockwork mechanism to operate to measure a toasting period independently of the handle, a latch engaging a part connected to said handle to hold the handle in its other position and the slice holder in its toasting position while the clockwork mechanism is operating, means operated by the clockwork mechanism upon the expiration of said toasting interval to release said latch to permit said biasing means to move the slice holder to the non-toasting position and to return the handle to said one position, and means mounting said handle for movement to disengage said latch to release said slice holder independently of the timing mechanism.

16. A toaster comprising a heating chamber, a slice holder in said chamber movable from a toasting position to a non-toasting position, means biasing said holder to move to said non-toasting position, a handle for said slice holder, a bracket supporting said handle pivoted at its upper end for movement on a transverse axis, a stop engaging the lower end of said bracket to limit its pivotal movement, a latch engaging said bracket to hold the slice holder in its toasting position, a timing mechanism arranged to release the latch automatically at the end of a predetermined interval of time, and the bracket arranged when moved on said pivotal axis to disengage said latch to release the slice holder.

17. A toaster comprising a heating chamber, a slice holder in said chamber, a movable carriage secured to said slice holder to move it in said heating chamber between a toasting and a non-toasting position, means biasing said carriage toward said non-toasting position, a handle for said carriage for moving it to its toasting position, a latch engaging said handle to hold the carriage in its toasting position, a timing mechanism arranged to release the latch automatically at the end of a predetermined interval of time, and means mounting said handle for limited freedom of movement with reference to said carriage to disengage said latch to release said carriage.

18. A toaster comprising a heating chamber, a slice holder in said chamber mounted for movement between a toasting position and a non-toasting position, means biasing the slice holder to its non-toasting position, a handle connected to the holder movable from one position to another to move the holder to the toasting position, locking means for holding the handle in said other position and said slice holder in its toasting position, a timing mechanism constructed and arranged to operate the locking means to release the handle and the holder at the end of a predetermined interval of time, means mounting said handle for limited freedom of movement toward its said one position without moving said holder toward its non-toasting position, and the handle when moved toward said one position operating to free the holder for movement to its non-toasting position.

19. A toaster comprising a heating chamber, a slice holder in said chamber mounted for movement between a toasting position and a non-toasting position, means biasing the slice holder to its non-toasting position, a handle connected to the holder movable from one position to another to move the holder to the toasting position, a timing means connected to said handle so that it is conditioned to measure a timing interval when the handle is operated to move the holder to the toasting position, the timing means after the slice holder reaches the toasting position operating independently of the handle to measure a toasting period, a latch engaging a part connected to said handle to hold the handle in its other position and the slice holder in its toasting position while the timing means is operating, and means operated by the timing means upon the expiration of said toasting interval to release said latch to permit said biasing means to move the slice holder to the non-toasting position and to return the handle to said one position.

HEBER L. NEWELL.